Aug. 3, 1937.     W. T. BIRCH     2,088,685
WATER PRESSURE AND RELIEF VALVE
Original Filed March 4, 1935
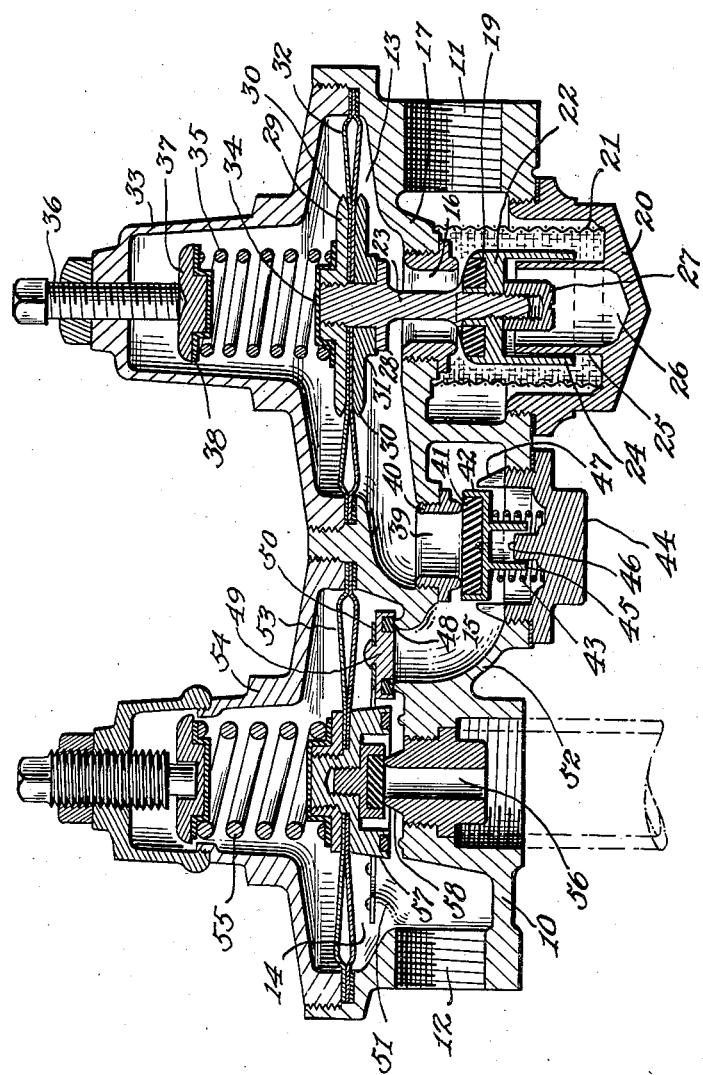
Inventor
William T. Birch
By Charles W. Hills
Attorney Patented Aug. 3, 1937

2,088,685

UNITED STATES PATENT OFFICE 2,088,685

WATER PRESSURE AND RELIEF VALVE

William Thomas Birch, Chicago, Ill.

Original application March 4, 1935, Serial No. 9,313. Divided and this application November 30, 1936, Serial No. 113,497

3 Claims. (Cl. 50—23)

The present invention relates to fluid pressure regulators and more particularly to relief valves, such as are used in conjunction with pressure regulators in closed hot water heating systems. By the use of such regulators and relief valves a constant pressure is maintained in the system below that of the supply pressure, the relief valves opening the outlet pressure to the atmosphere whenever expansion of the water, due to high temperature in the system, increases pressure therein above the safety or set point. After the water in the system cools so that the pressure falls below the set point, the main or regulator valve permits the inflow of supply pressure so as to raise the pressure in the system to the set point.

It is well understood that it is not permissible to install a manually operable valve between the automatic relief valve and the water heating unit of the system. It will be obvious that in the event of failure of the check valve between the relief valve and the regulator, it has heretofore been necessary to close down the heating system in order to repair the check valve. If the check valve is not repaired promptly after it becomes leaky the hot water finding its way back into the cold water supply system injures the water meter and cripples the cold water supply.

It is an object of the present invention to provide means whereby the regulator valve may be replaced or repaired while the hot water heating system is operating and without necessitating the closing down of or impairing the operation of the heating system.

It is also an important object of the present invention to provide check valve means so arranged that a check valve may be renewed or repaired while the hot water heating system is operating and without depriving the system of check valve protection.

Other and further objects of the present invention will appear hereinafter.

The present application is a division of application Serial No. 9,313, filed March 4, 1935, and resulting in Patent No. 2,067,229 of January 12, 1937.

In the accompanying drawing:

The figure is a central vertical longitudinal section through the complete unit, with parts in plan.

The regulator and relief valve unit has a casing indicated generally at 10. At one end, the casing 10 is provided with a water inlet 11, into which a service pipe is connected in use, and at the other end there is an outlet 12 for connection to a hot water heating system. The casing has in line two upwardly opening chambers, a low pressure chamber 13 and an outlet pressure chamber 14. These chambers are in communication with each other through a connecting channel 15 in which check valves, described hereinafter, are interposed.

The inlet 11 communicates with the low pressure chamber 13 through a vertical port 16 in a web 17 between the chamber and the inlet. In this port 16 a valve seat member 18 is threaded so as to be removable from below and to normally present a downwardly directed valve seat for engagement by a regulating valve 19.

In vertical alignment with the port 16, the base of the casing 10 has an opening normally closed by a screw cap 20 adapted to support the lower end of a cylindrical screen 21 which extends between the web 17 and the cap.

The valve 19 is inserted in a recess formed in a valve-carrying member 22 which is threaded on a valve stem 23, and the carrying member is provided with a downwardly extending annular wall portion 24 which encircles an upstanding annular wall 25 formed on the screw cap 20 to provide a dash pot 26 for the valve assembly. The carrying member 22 is suitably held in position as by a nut 27 threaded on the stem 23.

The wall 25 is adapted to function as a guide for the carrying member 22 and the valve 19 so that they may move in guided alignment with the port 16, and sufficient clearance is provided between the walls 24 and 25 to permit free relative movement of the opposed walls. The wall 24 gives substantial protection to the wall 25 against the accumulation of whatever foreign matter may escape through the screen 21, and also guards against the passage of foreign matter into the dash pot 26.

The stem 23 extends vertically through the port 16, and the upper end of the stem is enlarged at 28 to provide a large bearing area, and is continued in a reduced section to its end where a nut or washer 29 is threaded on, and this washer is provided with a beveled edge 30. Disposed opposite the washer 29 is a washer 31 seated on the enlarged portion 28 of the stem, and between these washers is clamped a diaphragm 32, formed of a pair of dished members, and which are seated on the casing 10 and held in position by a hood 33 screwed into position to engage the marginal portions of the diaphragms.

The washer 31 is also provided with a beveled edge to provide a curved face or fulcrum for the diaphragm as it flexes in operating the valve.

A cap 34, of soft rubber, or the like, is fitted over the threaded washer 29 to provide a seat for the lower end of a coiled compression spring 35, housed in the hood 33.

An adjusting screw 36 is threaded through the head of the hood 33, and bears against a pressure plate 37 provided with a lower portion reduced to enter the spring 35, and a cap 38, of soft rubber, or the like, is interposed between the pressure plate and the spring.

The web 17 is also bored to provide a port 39 communicating with the channel 15, and in this port a valve seat member 40 is threaded so as to be removable from below, and to normally present a downwardly directed valve seat for engagement by a check valve 41. The valve 41 is seated in a recess in a member 42, and the member 42 is pressed upwardly by a light coiled spring in the inner face of a dished screw cap 44 threaded into a bore in the casing 10.

The member 42 is provided with an integrally formed and downwardly extending annular wall 45 which enters the coiled spring 43, and is guided in its movement by an upwardly extending guide member 46 formed on the cap 44 and entering the lower end of the cup defined by the wall. The clearance between the inner face of the wall 45 and the guide member 46 is enough to permit free relative movement of these parts while they function to provide a dash pot for the valve assembly. The member 42 is also guided in its movement by inwardly extending and peripherally spaced ribs 47 formed integral with the annular wall of the plug 44.

The channel 15 rises vertically to open into the chamber 14, and the bore defining the channel is enlarged adjacent the valve assembly just described to provide a relatively large pocket for water so that cooling of the water and the precipitation of sediment from the water are facilitated. The channel is also shaped to make easy the use of a tool to scrape away lime or other deposits which may form around an upwardly directed valve seat 48 at the upper end of the channel when the tool is entered through the opening available when the plug 44 is removed.

A check valve 49 is placed in the chamber 14 to seat on the valve seat 48 to prevent the flow of hot water from the chamber 14 into the channel 15. The valve 49 is secured to one end of a flat spring arm 50 which is curved and is anchored at its other end on a boss 51 upstanding from the base of the chamber 14.

It will be evident that the valve 49 is immersed in hot water at all times and is also subject to the pressure of the hot water system. The water of water supply systems usually carries lime and other materials which coagulate and precipitate when heated, and there is obviously the probability of flakes of solid matter spilling over on to the seat 48 when the valve 49 lifts as make-up water is supplied through the regulator valve. The insertion of the flakes or specks of lime salts between the valve 49 and its seat 48 will cause the valve to leak hot water into the channel 15.

Because the channel 15 is relatively large at its lower end, and because, as is indicated at 52, the wall of the casing about the lower end of the channel is relatively thin, the leaking water will become colder, so that the valve 41 is operating under favorable conditions in having cold water on its inlet and outlet sides.

The check valve 41 will prevent the leaking water from returning to the supply system, and the recessed plug 44 forms a trap for whatever sediment is carried down by the leaking hot water.

Should the valve 41 become worn and leaky, it is evident that this valve may be repaired while the hot water system is operating normally because the valve 49 will provide the system with check valve protection. It requires but a few minutes to replace the valve 41, and even if the valve 49 happened to be leaky the loss of hot water during the changing of valve 41 would amount to but a few pints.

Because the valve 41 is not exposed to the severe operating conditions imposed by hot water under pressure and the precipitation of salts in hot water to be met by valve 49, the valve 41 may be relied on to prevent the return of hot water when it is desired to renew or repair the regulator valve 19.

The outlet chamber 14 is closed on one side by a diaphragm 53, and the diaphragm is seated at its peripheral portion on the casing 10 and is held in place by a hood 54 threaded in the casing. A coiled compression spring 55 is placed in the hood to urge the diaphragm against the pressure of the hot water system.

The outlet chamber is provided with an outlet 12 for connection to the piping of the hot water heating unit, and is also provided with a relief port 56 which is normally closed by valve means indicated generally by the numerals 57 cooperating with a valve seat 58.

I am aware that many changes may be made and numerous details of construction may be varied through a wide range without departing from the principles of this invention, and I, therefore, do not purpose limiting the patent granted hereon otherwise than is necessitated by the prior art.

What is claimed is:

1. A unitary structure comprising a casing housing a relief valve for connection to a hot water heating system, and a water pressure regulator in fluid communication with said relief valve and for connection to a water supply system, means in said casing interposed between said relief valve and said pressure regulator to prevent the flow of hot water from the heating system through said pressure regulator, said means comprising a first check valve normally closed by and exposed to the hot water under pressure of the heating system, a second check valve normally shielded against hot water under pressure by said first check valve, and conduit means interposed between said first and said second check valves and provided with a thin wall section arranged to cool water leaking from said first check valve towards said second check valve.

2. A unitary structure comprising a casing housing a relief valve for connection to a hot water heating system and a water pressure regulator in fluid communication with said relief valve and for connection to a water supply system, a first check valve in said casing normally closed by and exposed to the hot water under pressure of the heating system, a second check valve in said casing normally shielded against hot water under pressure by said first check valve, means defining a conduit in said casing interposed between said first check valve and said second check valve provided with a thin wall section arranged to cool water leaking through said first check valve towards said second check valve, said second check valve being arranged removable for repair while the hot water system is under pressure and without depriving the hot water system of check valve protection.

3. A unitary structure comprising a casing housing a relief valve for connection to a hot water heating system and a water pressure regulator in fluid communication with said relief valve and for connection to a water supply system, a first check valve in said casing normally closed by and exposed to the hot water under pressure of the heating system, a second check valve in said casing cooperable with said first check valve and normally shielded by said first check valve against hot water under pressure, means in said casing defining a short conduit for water between said first and said second check valves and provided with a thin wall section adapted to cool water leaking from said first check valve, a plug threaded in said casing to carry said second check valve and entering a side opening of said conduit, said plug being arranged removable from the side opening of said conduit for the insertion of a tool to remove sediment about said first check valve, and said short conduit being formed to permit the ready insertion of the tool.

WILLIAM THOMAS BIRCH.